(12) United States Patent
Matta et al.

(10) Patent No.: US 7,744,516 B2
(45) Date of Patent: Jun. 29, 2010

(54) MACHINE FOR THE PRODUCTION OF BAGS MADE OF HEAT-SEALED ALVEOLAR OR FOAMED THERMOPLASTIC MATERIAL

(75) Inventors: Emiliano Matta, Arignano (IT); Luigi Matta, Arignano (IT)

(73) Assignee: OFFMAR S.r.l., Arignano (Torino) (IT)

( * ) Notice: Subject to any disclaimer, the term of this patent is extended or adjusted under 35 U.S.C. 154(b) by 56 days.

(21) Appl. No.: 12/127,160

(22) Filed: May 27, 2008

(65) Prior Publication Data
US 2008/0289304 A1   Nov. 27, 2008

(30) Foreign Application Priority Data
May 24, 2007   (IT)   .......................... TO2007A0369

(51) Int. Cl.
*B31B 1/64* (2006.01)
(52) U.S. Cl. ...................... 493/189; 493/194; 493/201; 493/209
(58) Field of Classification Search ................ 493/189, 493/207, 209, 190, 194, 195, 199, 201, 202
See application file for complete search history.

(56) References Cited
U.S. PATENT DOCUMENTS

| | | | | |
|---|---|---|---|---|
| 3,684,254 A | * | 8/1972 | Henry ........................ 366/116 |
| 4,082,941 A | * | 4/1978 | Sukow et al. ................ 219/243 |
| 4,384,438 A | * | 5/1983 | Hilmersson .................... 53/51 |
| 4,518,378 A | * | 5/1985 | Schulze et al. .............. 493/204 |
| 4,563,862 A | * | 1/1986 | McElvy ....................... 53/552 |
| 4,585,508 A | * | 4/1986 | Ehlers ........................ 156/494 |
| 5,062,253 A | * | 11/1991 | Bacon et al. ................... 53/451 |
| 5,080,747 A | * | 1/1992 | Veix ............................ 156/352 |
| 5,540,035 A | * | 7/1996 | Plahm et al. ................... 53/451 |
| 5,974,770 A | * | 11/1999 | Kume et al. ................... 53/550 |
| 6,041,580 A | * | 3/2000 | Wojtech ....................... 53/551 |

* cited by examiner

*Primary Examiner*—Sameh H. Tawfik
(74) *Attorney, Agent, or Firm*—Heslin Rothenberg Farley & Mesiti P.C.

(57) ABSTRACT

A machine for the production of bags made of alveolar or foamed plastic material starting from at least one continuous web with superimposed flaps fed continuously to a heat-sealing assembly. The heat-sealing assembly is actuated according to a pendular motion in synchronism with continuous advance of the web, and is pre-arranged for carrying out, at the same time as heat-sealing, half-cuts on the web, which is then folded in concertina fashion by means of a lapper assembly at output from the machine.

12 Claims, 5 Drawing Sheets

MACHINE FOR THE PRODUCTION OF BAGS MADE OF HEAT-SEALED ALVEOLAR OR FOAMED THERMOPLASTIC MATERIAL

CROSS-REFERENCE TO RELATED APPLICATION

This application claims priority from Italian patent application Serial No. TO2007A000369, filed on May 24, 2007, the entirety of which is hereby incorporated by reference.

FIELD OF THE INVENTION

The present invention relates in general to the production of containers in the form of bags or the like, made of heat-sealable plastic material.

More in particular the invention relates to a machine for the production of such containers starting from at least one continuous web with superimposed flaps, typically made of alveolar or foamed polyethylene, fed continuously to a heat-sealing assembly.

BACKGROUND OF THE INVENTION

In currently known machines of this type, the heat-sealing assembly includes a hot-blade device and a contrast element set transversely on opposite sides with respect to the web, and actuation means for controlling displacement of the heat-sealing assembly and mutual opening and closing between the hot-blade device and the contrast element in synchronism with advance of the web.

In these known machines, the heat-sealing assembly is traditionally mounted on a slide or a carriage, which can be translated with reciprocating rectilinear motion parallel to the direction of advance of the web.

This arrangement entails a sensible encumbrance that results in an overall longitudinal dimension of the machine that at times does not reconcile with the space available for its location of use.

Furthermore, the system of reciprocating rectilinear displacement of the heat-sealing assembly sets limits to the rate of advance of the continuous web, with consequent relatively modest production rates, and is generally complicated from the constructional standpoint and hence costly.

SUMMARY OF THE INVENTION

The object of the present invention is to overcome the aforesaid drawbacks and to provide a machine for the production of bags made of thermoplastic material of the type defined above having contained longitudinal dimensions, as well as enabling higher production rates and of being relatively simple and inexpensive to produce.

According to the invention, the above object is achieved principally thanks to the fact that the actuation means of the heat-sealing assembly, in synchronism with advance of the web, are pre-arranged for carrying out a pendular motion of said heat-sealing assembly.

According to a preferred embodiment of the invention, the heat-sealing assembly includes a generally vertical support, oscillating about a transverse axis situated underneath the web and carrying at the top the aforesaid hot-blade device and the corresponding contrast element, and the actuation means comprise a crank mechanism with motor-driven eccentric camshaft parallel to said transverse axis and actuating said oscillating support.

The eccentric camshaft moreover carries a cam co-operating with an oscillating rocker, which controls, via a pair of respective connecting rods, translation along said support of the hot-blade device and of the contrast element in mutually opposite directions for enabling mutual opening and closing during the pendular motion of the support.

According to another advantageous characteristic of the invention, operatively associated to the heat-sealing assembly is a blade for transverse cutting of the web, advantageously shaped so as to perform a half-cut. In this case, the machine is provided, downstream of the heat-sealing assembly, with a lapper assembly designed to carry out folding in bellows fashion of the bags joined through the half-cut lines, so as to facilitate subsequent packaging thereof. This solution is advantageous as compared to the case where the bags are separated from one another following upon a complete cut of the web, in so far as it enables carrying-out of packaging thereof in a more orderly and rational way. At the moment of use, the bags may be easily separated by tearing of the half-cut lines that connect them together.

Advantageously associated to the lapper assembly is a motor-driven tearing device selectively actuatable for dividing the web in the areas corresponding to pre-chosen half-cut lines.

BRIEF DESCRIPTION OF THE DRAWINGS

Further characteristics and advantages of the invention will emerge clearly in the course of the ensuing description, with reference to the annexed drawings, which are provided purely by way of non-limiting example and in which.

BEST MODE FOR CARRYING OUT THE INVENTION

Figure 1:
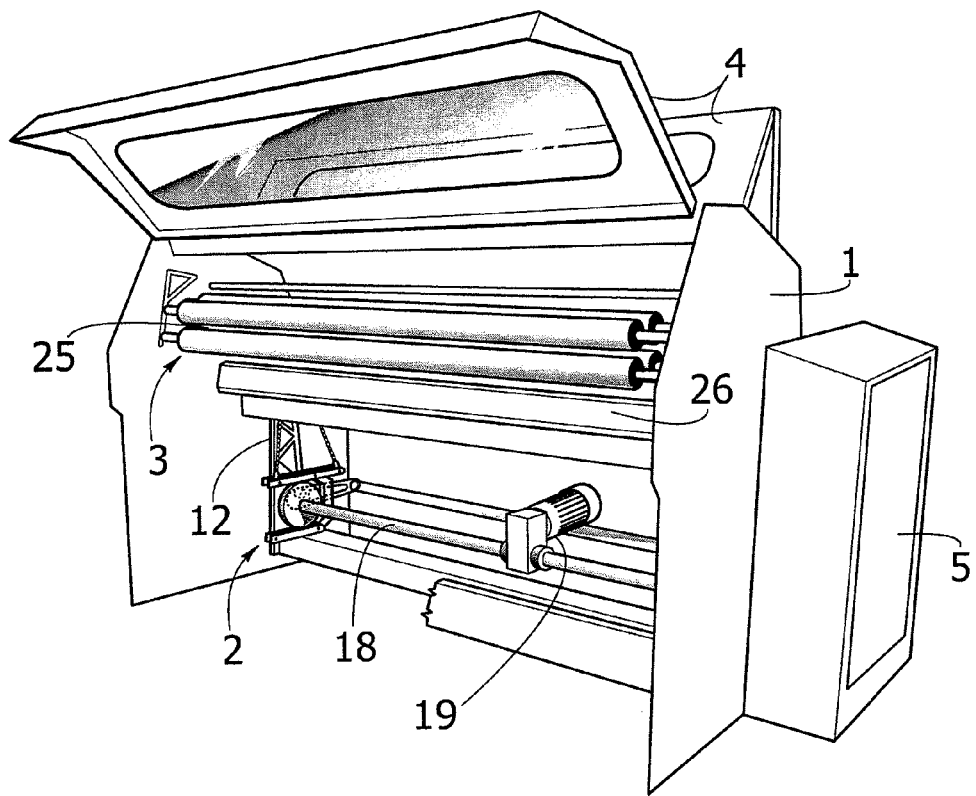
FIG. 1 is a schematic perspective front view of a machine according to the invention.
Figure 3:
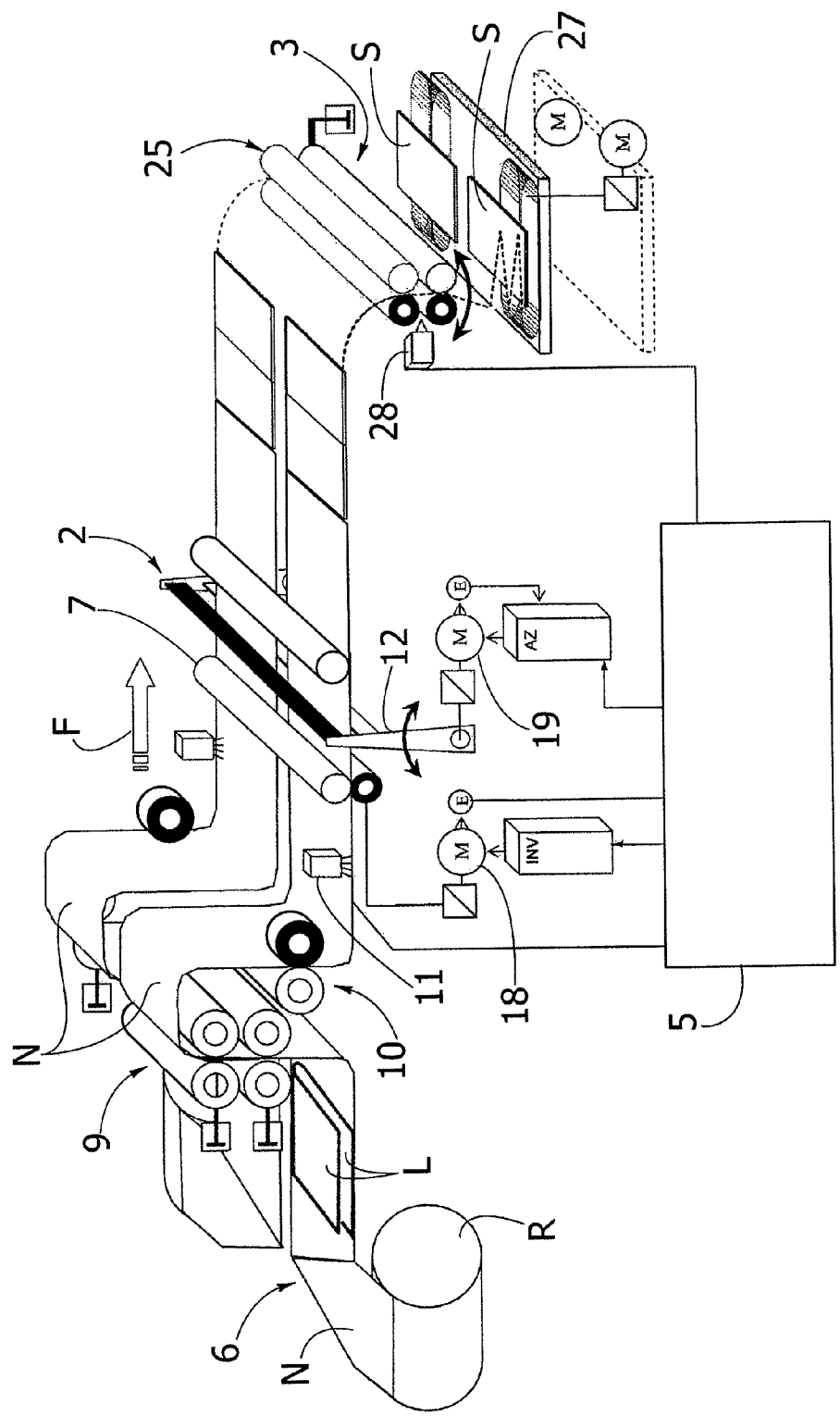
FIG. 3 is a view in the form of diagram that illustrates schematically the fundamental functional elements of the machine.

With initial reference to FIGS. 1 and 3, the machine according to the invention basically comprises a supporting structure 1 with reduced horizontal encumbrance carrying a heat-sealing assembly, designated as a whole by 2, and a drawing and lapping assembly, designated as a whole by 3, and accessible through a mobile front guard 4. Set at the side of the supporting structure 1 is a cabinet, housed within which is a programmable electronic control unit 5 for controlling operation of the machine.

As is shown schematically in FIG. 3, associated to the rear side of the machine is an unwinding device 6 for unreeling at least one continuous web N of thermoplastic material, typically polyethylene in an alveolar form (i.e., with air bubbles) or else foamed polyethylene, which is unwound from a reel R. According to the width of the machine, the device 6 can be pre-arranged for unwinding webs N of different width and also of two or more of said webs N. The example illustrated relates precisely to the case where the machine operates with two webs N set alongside one another, each of which is folded over, prior to introduction into the machine and by means of a static device, not illustrated but generally conventional, in a configuration with two superimposed flaps L. The ensuing description, referred to one of the two webs N, applies identically also to the other web N.

Drawing of the web N with superimposed flaps L through the heat-sealing assembly 2 is provided via a motor-driven roller unit 7 actuated by a motor 8, as well as by a further motor-driven roller unit 25 referred to in what follows, so that the web N advances continuously in the direction of the arrow F at a constant rate that can be selectively regulated via the electronic control unit 5.

Figure 2:
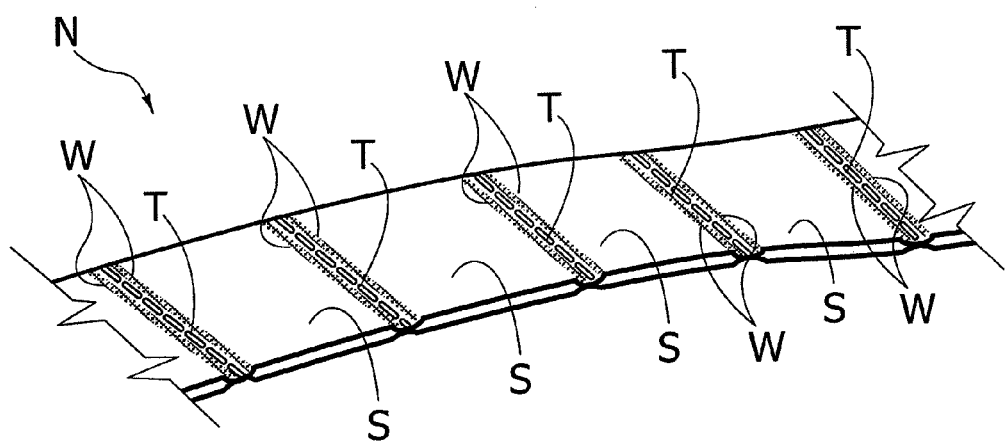
FIG. 2 shows an example of a possible product provided with the machine according to the invention.

Between the unwinding device 6 and the heat-sealing assembly 2 the machine is moreover equipped with further operative assemblies that can be used according to the finished product obtained from the web N. FIG. 2 illustrates an example of finished product, consisting in a series of bags S, each of which is closed along three sides and open in a position corresponding to the fourth side. Alternatively, it is possible to provide bags with a flap projecting in a position corresponding to the open end, or else tubular bags, i.e., ones open at to two opposite sides, or else bags open at two contiguous sides, or else even different arrangements.

The aforesaid additional operating units can consist, for example, of a pre-cutting and longitudinal-cutting assembly, designated as a whole by 9, a longitudinal heat-sealing assembly, designated as a whole by 10, and an adhesive-spraying assembly, designated as a whole by 11.

Figure 4:
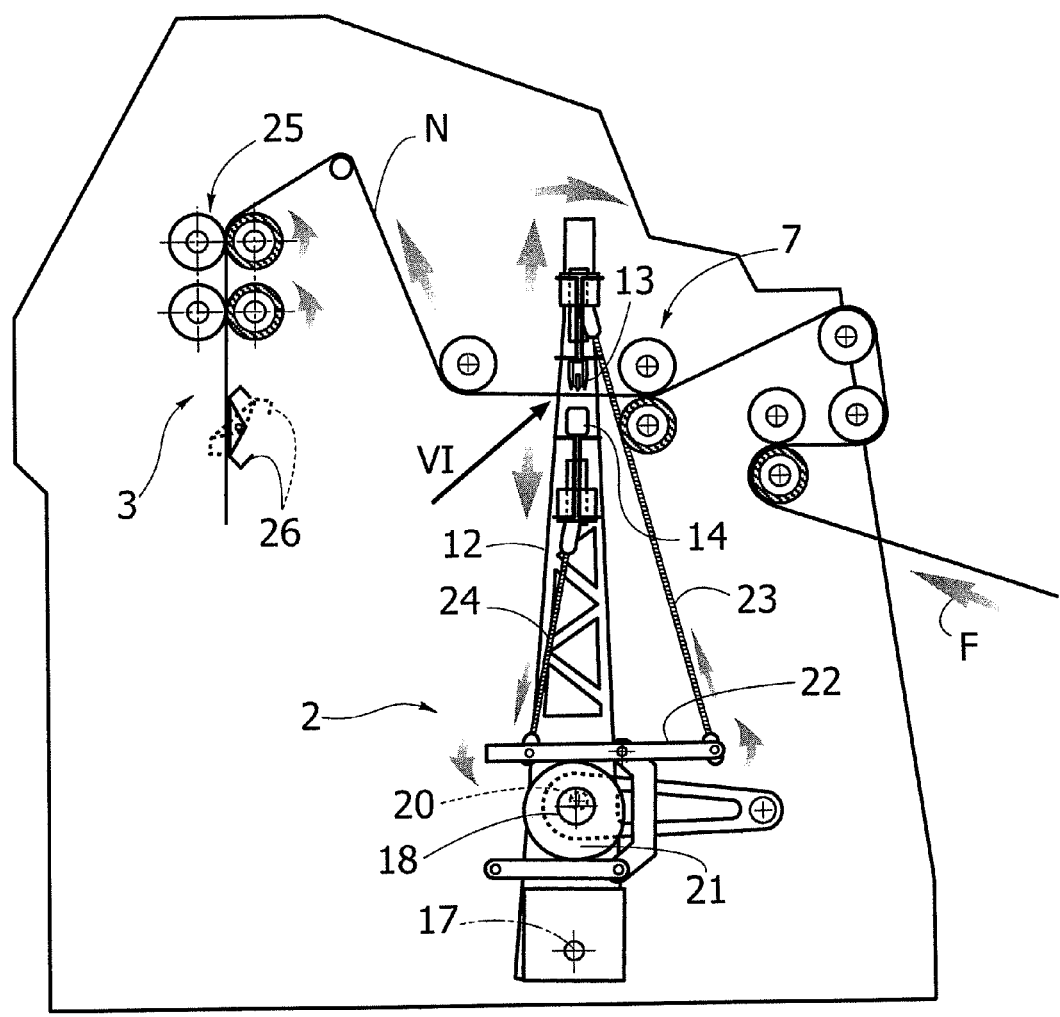
FIG. 4 is a schematic cross-sectional view at a larger scale of the heat-sealing assembly of the machine, represented in a first condition.
Figure 5:
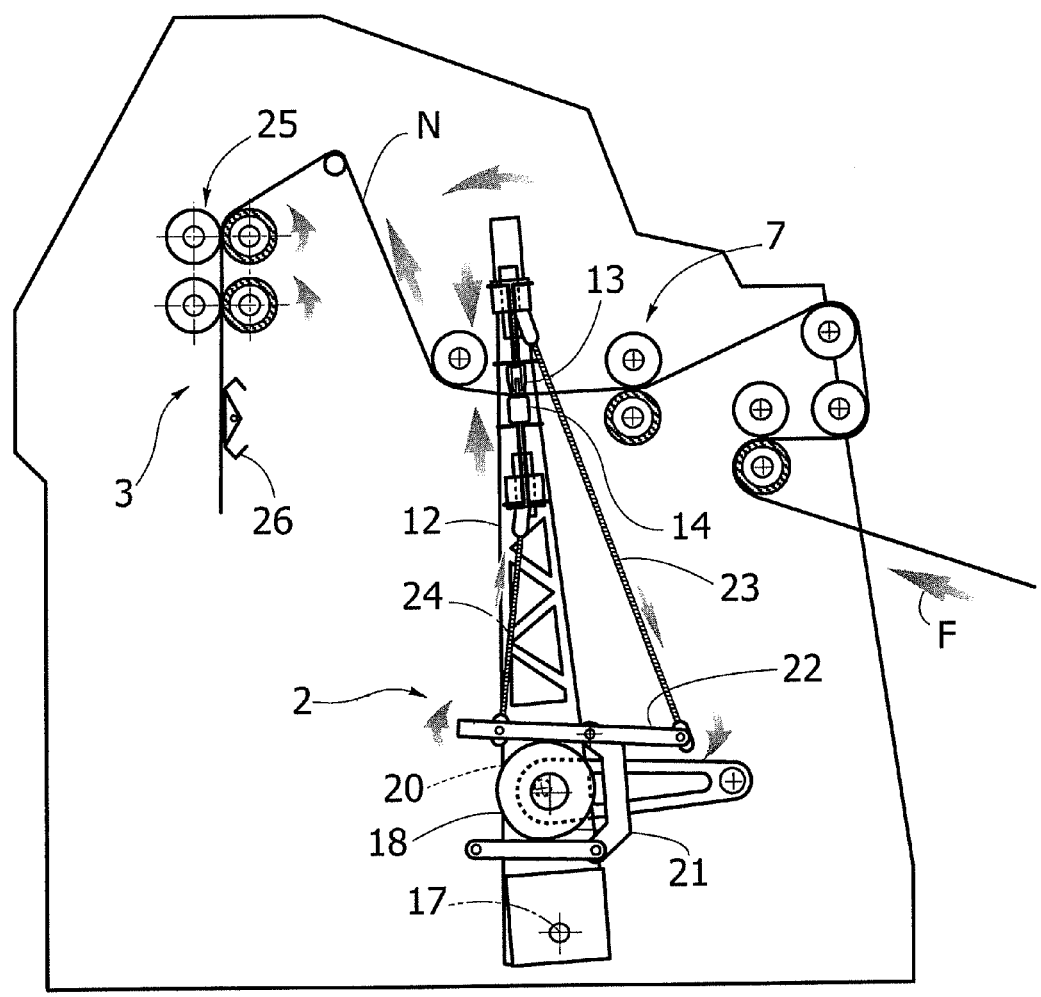
FIG. 5 is a view similar to that of FIG. 4 showing the heat-sealing assembly of the machine in a second condition.

With reference now in greater detail to FIGS. 4 and 5, according to a peculiar aspect of the invention, the heat-sealing assembly 2 comprises a generally vertical support 12 arranged at the side of the web N and oscillating about a transverse axis 17 situated underneath the path of advance of said web N.

The support 12 carries a hot-blade device 13 and a contrast element 14, which are set transverse, respectively above and beneath the web N. In effect, the heat-sealing assembly 2 includes two identical oscillating supports 12, situated on opposite sides of the web N, which define with the hot-blade device 13 and the contrast element 14 a general portal conformation. In what follows reference will be made to just one of said supports 12, it being understood that the corresponding description applies identically also to the other support.

The hot-blade device 13 and the contrast element 14 are mutually displaceable, in the way clarified in what follows, between a position where they are set at an opening distance with respect to one another and a position where they are set at a closing distance with respect to one another, in synchronism with advance of the web N.

Figure 6:
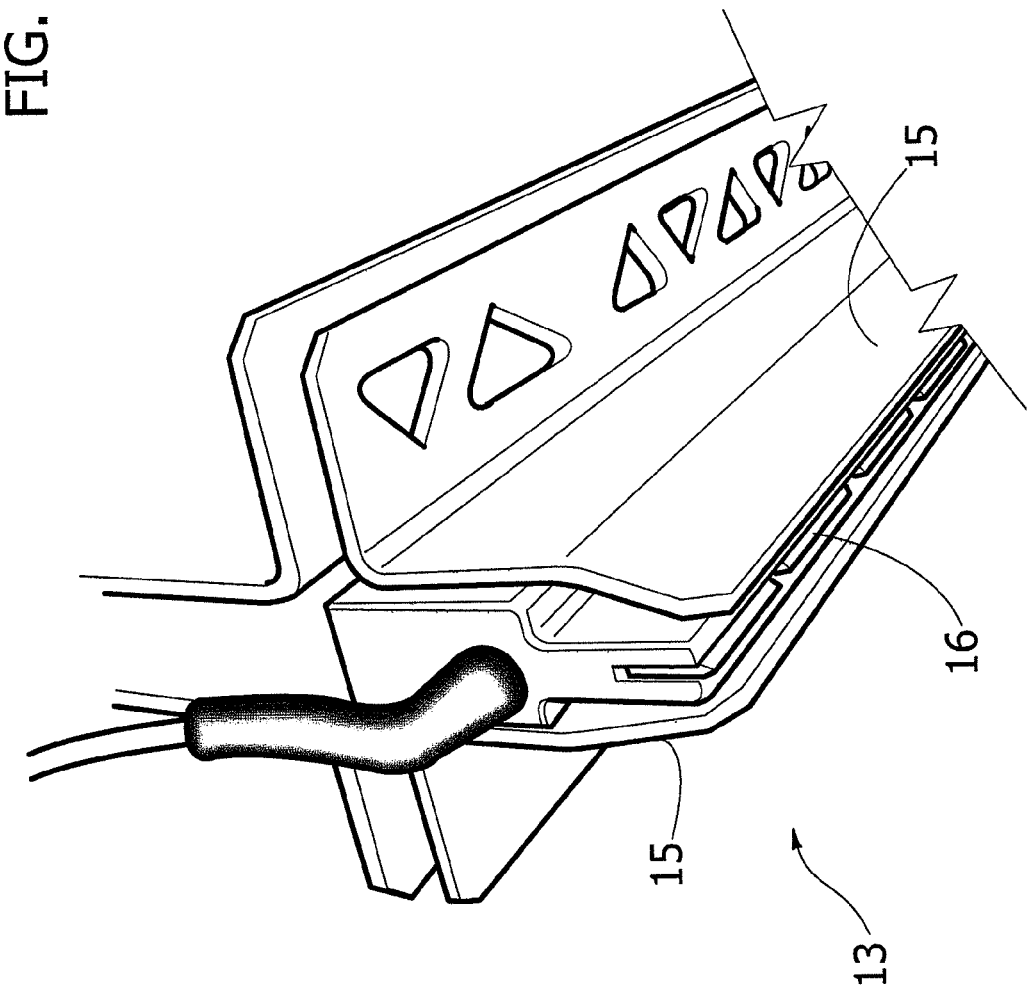
FIG. 6 is a partial perspective view at a larger scale of the detail indicated by the arrow VI in FIG. 4.

FIG. 6 illustrates in greater detail the hot-blade device 13: this comprises a pair of electrically heated bars 15, arranged transverse to the web N and set apart from one another, between which is set a blade for transverse cutting 16. Said blade 16 can be continuous or else, according to a further peculiar aspect of the invention, can be formed by sectors designed to provide, as will be seen in what follows, a half-cut of the web N at the same time as the heat-sealing step.

The conformation of the hot-blade device 13 is such as to enable a convenient periodic cleaning of the heated bars 15, as well as a fast restoration of the cutting blade 16 in the event of wear.

As has been said, according to the fundamental aspect of the invention, the support 12 carrying the hot-blade device 13 and the contrast element 14 is displaceable, in synchronism with continuous advance of the web N, according to a pendular motion, about the transverse axis 17. For said purpose, the support 12 is actuated via a crank mechanism formed by a shaft 18 set parallel above the axis 17 and actuated by an electric motor 19, carrying an eccentric cam designated by 20 in FIGS. 4 and 5. By means of the eccentric cam 20, which engages a slit (not illustrated) of the support 12, the continuous rotation of the shaft 18 provides the reciprocating oscillatory motion of the support 12 between the positions represented in FIGS. 4 and 5: during oscillation from the position of FIG. 4 to that of FIG. 5 heat-sealing of the web N is carried out as a result of the closing action between the hot-blade device 13 and the contrast element 14, whilst during oscillation in the opposite direction from the position of FIG. 5 to that of FIG. 4, the hot-blade device 13 and the contrast element 14 are kept in a position where they are set at an opening distance apart. Said movements of closing and opening are performed thanks to the reciprocating vertical displacement of the hot-blade device 13 and of the contrast element 14 along the support 12, performed by the same shaft 20 via a cam 21 actuated thereby. The cam 21 co-operates with an oscillating rocker 22 connected on one side to the hot-blade device 13 via a first connecting rod 23, and on the other to the contrast element 14 via a second connecting rod 24. During oscillation of the support 12 from the position of FIG. 4 to that of FIG. 5 performed by the eccentric cam 20, the cam 21 controls closing between the hot-blade device 13 and the contrast element 14 via the connecting rod 23, which acts as a tie-rod, and the connecting rod 24, which acts as a strut. During the step of return of the support 12 from the position of FIG. 5 to that of FIG. 4 the situation is reversed, in the sense that the connecting rod 23 acts as a strut and the connecting rod 24 acts as a tie-rod so as to control mutual recession between the hot-blade device 13 and the contrast element 14.

The motor 19 that actuates the heat-sealing assembly 2 is controlled in a programmable and co-ordinated way by the motor 8 for feeding of the web N in such a way as to provide in succession along this two contiguous lines of welding W (FIG. 2), separated by a line of half-cut T generated by the sectored blade 16.

Downstream of the heat-sealing assembly 2, the web N proceeds then towards the lapping assembly 3, which, in the case of the example illustrated, comprises the two pairs of motor-driven drawing rollers 25 and a thrust bar 26, which can be displaced in a reciprocating way (with modalities not illustrated herein but within the reach of a person skilled in the branch) between a retracted position and an advanced position with respect to the web N at output from the rollers 25, in synchronism with its arrival. Via the rollers 25 and the bar 26 the web N is deposited on a resting surface 27 (FIG. 3), being folded over in concertina fashion about the pre-cutting lines T.

Once the desired height of the pack formed by the bags S thus folded and superimposed is reached, a short and sharp acceleration is impressed on the bottom rollers 25 with respect to the top rollers 25, controlled via a sensor 28 designed to detect the presence of a half-cut T and connected to the control unit 5. Alternatively, the position of the half-cut T to be torn can be determined electronically on the basis of advance of the web N, or with other equivalent systems.

As a result of said momentary acceleration there is performed tearing of the line of half-cut T comprised between the top and bottom rollers 25. The pack thus completed can be removed from the resting surface 27 to enable formation of the next pack.

It is evident from the foregoing description that the machine according to the invention, thanks to the system of pendular motion of the heat-sealing assembly 2, presents appreciably reduced longitudinal encumbrance and enables rates of advance appreciably greater than in the case of conventional machines, with a considerable increase in production rates.

Of course, the details of construction and the embodiments may vary widely with respect to what is described and illustrated herein, without thereby departing from the scope of the present invention, as defined in the ensuing claims.

What is claimed is:

1. A machine for the production of bags made of thermoplastic material starting from at least one continuous web with superimposed flaps fed continuously to a heat-sealing assembly, said heat-sealing assembly including:
   a hot-blade device and a contrast element set transversely on opposite sides with respect to the web,
   actuation means for controlling displacement of the heat-sealing assembly and mutual opening and closing between said hot-blade device and said contrast element in synchronism with advance of the web, and
   wherein said actuation means are pre-arranged for carrying out a pendular motion of said heat-sealing assembly; and wherein said heat-sealing assembly includes a generally vertical support oscillating about a transverse axis situated underneath the web and carrying at the top said hot-blade device and said contrast element, and said actuation means including a crank mechanism with a motor-driven shaft with an eccentric cam parallel to said transverse axis and actuating said oscillating support.

2. The machine according to claim 1, wherein said eccentric camshaft carries a cam co-operating with an oscillating rocker that controls, via a pair of respective connecting rods, the reciprocating translation of said hot-blade device and of said contrast element along said support in mutually opposite directions for providing mutual opening and closing during the pendular motion of said support.

3. The machine according to claim 1, wherein said hot-blade device comprises a pair of heated bars mutually parallel and contiguous.

4. The machine according to claim 3, wherein set between said heated bars is a blade for transverse cutting of the web.

5. The machine according to claim 4, wherein said cutting blade is shaped so as to provide a half-cut of the web between each pair of heat-seals performed by said pair of heated bars.

6. The machine according to claim 5 further comprising, downstream of said heat-sealing assembly, a lapper assembly for folding over said web about said half-cut in concertina fashion.

7. The machine according to claim 6, wherein associated to said lapper assembly is a motor-driven tearing device selectively actuatable for dividing the web in areas corresponding to said half-cuts.

8. The machine according to claim 1, wherein said web is made of alveolar or foamed polyethylene.

9. The machine according to claim 1, further comprising a longitudinal cutting assembly for cutting the web.

10. The machine according to claim 1, further comprising a longitudinal heat-sealing assembly for sealing the web.

11. The machine according to claim 1, pre-arranged for operating with a pair of webs set alongside one another.

12. The machine according to claim 1, further comprising an electronic control unit for regulating and controlling a rate of advance of the web and the pendular motion of said heat-sealing assembly.

* * * * *